(12) United States Patent
Herzig et al.

(10) Patent No.: US 8,722,612 B2
(45) Date of Patent: May 13, 2014

(54) COMPOSITIONS COMPRISING QUAT COMPOUNDS AND ORGANOPOLYSILOXANES

(75) Inventors: Christian Herzig, Waging (DE); Richard Becker, Burghausen (DE); Eva Baumann, Lenggries (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/996,155

(22) PCT Filed: Dec. 19, 2011

(86) PCT No.: PCT/EP2011/073246
§ 371 (c)(1),
(2), (4) Date: Jul. 18, 2013

(87) PCT Pub. No.: WO2012/084830
PCT Pub. Date: Jun. 28, 2012

(65) Prior Publication Data
US 2013/0296220 A1   Nov. 7, 2013

(30) Foreign Application Priority Data

Dec. 21, 2010  (DE) .................. 10 2010 063 696

(51) Int. Cl.
*C11D 9/36* (2006.01)
*C11D 1/62* (2006.01)

(52) U.S. Cl.
USPC ........... 510/466; 510/276; 510/343; 510/417; 510/432; 510/504; 510/515

(58) Field of Classification Search
USPC .......... 510/276, 343, 417, 432, 466, 504, 515
See application file for complete search history.

(56) References Cited

U.S. PATENT DOCUMENTS

| 5,028,236 | A | 7/1991 | Kortmann et al. |
| 5,942,588 | A | 8/1999 | Ettl et al. |
| 2003/0092804 | A1 | 5/2003 | Detering et al. |
| 2009/0247629 | A1 | 10/2009 | O'Lenick et al. |
| 2011/0024679 | A1* | 2/2011 | Herzig ............ 252/182.3 |
| 2013/0123535 | A1 | 5/2013 | Herzig |

FOREIGN PATENT DOCUMENTS

| CH | 388246 | 9/1964 |
| DE | 19505751 A1 | 8/1996 |
| EP | 0869168 A2 | 10/1998 |
| EP | 1259672 B1 | 11/2002 |
| GB | 1000383 | 8/1965 |
| WO | 96/26318 A1 | 8/1996 |
| WO | 2009/121751 A1 | 10/2009 |
| WO | 2012016837 A1 | 2/2012 |

OTHER PUBLICATIONS

Kua-Yann Lai (Editor), "Liquid Detergents", Second Edition, p. 509, CRC-Press 2006.

* cited by examiner

*Primary Examiner* — Charles Boyer
(74) *Attorney, Agent, or Firm* — Brooks Kushman P.C.

(57) ABSTRACT

Compositions useful as fabric softeners contain a long chain β-ketocarbonylquat containing at least one quaternary ammonium group and an organopolysiloxane polymer or siloxane copolymer.

18 Claims, No Drawings

COMPOSITIONS COMPRISING QUAT COMPOUNDS AND ORGANOPOLYSILOXANES

CROSS-REFERENCE TO RELATED APPLICATIONS

This application is the U.S. National Phase of PCT Appln. No. PCT/EP2011/073246 filed Dec. 19, 2011 which claims priority to German Application No. 10 2010 063 696.7 filed Dec. 21, 2010, the disclosures of which are incorporated in their entirety by reference herein.

BACKGROUND OF THE INVENTION

1. Field of the Invention

The invention concerns compositions comprising quats and organopolysiloxanes and their use in fabric conditioners.

2. Description of the Related Art

EP 1 259 672 B1 describes the use of alkyl-ketene dimer dispersions for the crease-resist finishing of textiles. Also described are cationic emulsifiers prepared from alkyl-ketene dimer and polyethyleneimine in a partial reaction. Except for these partial-reaction products, in which some amine groups of the polyethyleneimine are amidated, the dispersed alkyl-ketene dimer remains intact and ends up as such on the fiber. Quaternization of the partially converted polyethyleneimine emulsifier is not described and would also be scarcely economical owing to the high percentage of primary and secondary amino groups.

Alkyl-ketene dimer dispersions useful as textile auxiliaries are described in the following documents: CH 388246 describes the use of formulations which contain the ketene softener "Aquapel" 380 (Hercules Powder Co.) for impregnating and hydrophobicizing textiles. U.S. Pat. No. 5,028,236 also utilizes alkyl-ketene dimers for hydrophobicizing wool and nylon fibers. The same purpose is behind the use in WO 96/26318 of alkyl-ketene dimer dispersions as sizing agents for paper, i.e., controlled hydrophobicization.

WO 2009/121751 describes the reaction of aminosiloxanes with alkyl-ketene dimers for preparing waxes of very high polydimethylsiloxane content. Quaternary compounds cannot be prepared in this way.

US 2009/247629 A1 describes the preparation of polymeric organic quats obtainable by esterifying a dimer acid with a dimethylaminoalkanol and then reacting with polyether epichlorohydrins. This sequence of syntheses is relatively involved and must be performed at high temperature (200° C.) over many hours (3-8 h), i.e., is somewhat unattractive.

Kuo-Yann Lai (Editor) writes in "Liquid Detergents", second edition, page 509, CRC-Press 2006, that the additional incorporation of "PDMS" in softener formulations based on esterquats leads to a surprising improvement in the wetting of cotton fabric treated therewith.

EP 869 168 A1 makes a similar disclosure by describing formulations which further comprise hydrophilic emulsifiers, the esterquats of which may be modified with further oxyethylene groups.

SUMMARY OF THE INVENTION

An object of the present invention is that of providing quats (i.e., compounds containing at least one quaternary ammonium group) that can be prepared quickly and almost quantitatively in a simple process and have a comparatively long-chain hydrocarbon radical, preferably a fatty acid radical. A further object addressed by the present invention is that of providing compositions comprising quats and organopolysiloxanes useful in fabric conditioners, wherein the textiles treated therewith have an improved softness and an improved hydrophilicity. These and other objects are solved by the present invention, which provides a composition comprising:

(1) a β-ketocarbonylquat containing one or more β-ketocarbonyl groups of the general formula

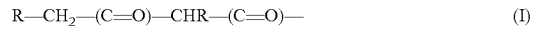

R—CH$_2$—(C=O)—CHR—(C=O)—     (I)

and one or more quaternary ammonium groups, where

R is an aliphatic hydrocarbon radical of 6 to 28 carbon atoms and may be the same or different in each occurrence, and (2) an organopolysiloxane or siloxane copolymer that is liquid at 25° C. and 1020 hPa.

DETAILED DESCRIPTION OF THE PREFERRED EMBODIMENTS

R is preferably an aliphatic hydrocarbon radical of 10 to 26 carbon atoms, more preferably 12 to 20 carbon atoms.

Quaternary ammonium groups are derivatives of ammonium groups which have all four hydrogen atoms replaced by four N—C-bonded (optionally substituted) hydrocarbon groups, such as alkyl groups.

Preferably, the β-ketocarbonyl group of formula (I) is bonded to a radical Y, wherein Y is a divalent radical of the formula —O—, —NH—, —NR$^1$—, preferably —NH—, —NR$^1$—, or a trivalent radical of the formula =N—, and R$^1$ is a monovalent hydrocarbon radical of 1 to 30 carbon atoms, preferably 1 to 18 carbon atoms.

The β-ketocarbonylquats of the present invention preferably contain one or two quaternary nitrogen atoms, preferably one quaternary nitrogen atom.

They preferably have a molecular weight (M$_n$) of at least 300 daltons and more preferably in the range from 500 to 2000 daltons. Charge density is preferably in the range from 0.5 to 2.0 mequiv. of N$^+$/g.

Preferred β-ketocarbonylquats are those of the general formula

[R$^3$R$^4$R$^5$N$^{(+)}$—R$^2$]$_a$Y—ZX$^{(-)}$     (II), wherein a is 1 or 2, with the proviso that when a=1, Y is a divalent radical and when a=2, Y is a trivalent radical, Y is a divalent radical of the formula —O—, —NH—, —NR$^1$—, or a trivalent radical of the formula =N—, X$^{(-)}$ is a counter-ion to the positive charge on the quaternary nitrogen atom, Z is a β-ketocarbonyl group of the formula

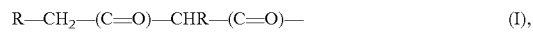

R—CH$_2$—(C=O)—CHR—(C=O)—     (I),

R is as defined above,

R$^1$ is a monovalent hydrocarbon radical of 1 to 30 carbon atoms, preferably 1 to 18 carbon atoms, R$^2$ is a divalent C$_1$-C$_{18}$ hydrocarbon radical which may contain one or more separate oxygen atoms, R$^3$ is a monovalent hydrocarbon radical of 1 to 30 carbon atoms, preferably 1 to 18 carbon atoms, and is the same or different in each occurrence, R$^4$ is R$^3$ or a radical of the formula

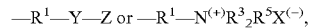

—R$^1$—Y—Z or —R$^1$—N$^{(+)}$R$^3$$_2$R$^5$X$^{(-)}$, or $R^3$ and $R^4$ together or two $R^3$ radicals together are a divalent $C_3$-$C_{12}$ hydrocarbon radical which may optionally contain an oxygen atom or a nitrogen atom, and $R^5$ is a monovalent hydrocarbon radical of 1 to 18 carbon atoms, preferably 1 to 12 carbon atoms.

The present invention further provides a process for preparing the β-ketocarbonylquat, which process comprises a first step of reacting an alkyl-ketene dimer (a) of the general formula

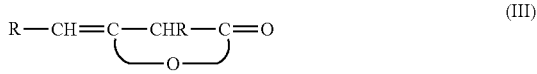

(III)

wherein R is as defined above, with amino compounds (b) which contain at least one tertiary amino group and at least one protic group selected from the group consisting of the formulae —OH, —$NH_2$, —$NHR^1$ and —NH—, preferably —$NH_2$, —$NHR^1$ and —NH—, wherein $R^1$ is as defined above, to obtain compounds (c) comprising tertiary amino groups, and a second step of partly or wholly quaternizing the tertiary nitrogen atoms from the compounds (c) obtained in the first step, with alkylating agents (d).

R is preferably an alkyl radical and more preferably a linear alkyl radical, of not less than 6 to 28 carbon atoms, preferably 10 to 26 carbon atoms and more preferably 12 to 20 carbon atoms.

$R^1$ is preferably an alkyl radical of 1 to 18 carbon atoms.

$R^3$ and $R^4$ are preferably alkyl radicals or cycloalkyl radicals. Preferably, at least one of $R^3$, $R^4$ and $R^5$ is a methyl or ethyl radical.

Examples of R radicals are alkyl radicals such as hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl and methylcyclohexyl radicals; alkenyl radicals such as the vinyl, 5-hexenyl, cyclohexenyl, 1-propenyl, allyl, 3-butenyl and 4-pentenyl radicals; and alkynyl radicals such as the ethynyl, propargyl and 1-propynyl radicals.

Examples of $R^1$ hydrocarbon radicals are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals, such as the n-octadecyl radical; cycloalkyl radicals such as the cyclopentyl, cyclohexyl, cycloheptyl and methylcyclohexyl radicals; alkenyl radicals such as the vinyl, 5-hexenyl, cyclohexenyl, 1-propenyl, allyl, 3-butenyl and 4-pentenyl radicals; alkynyl radicals such as the ethynyl, propargyl and 1-propynyl radical; aryl radicals such as the phenyl, naphthyl, anthryl and phenanthryl radicals; alkaryl radicals such as o-, m- and p-tolyl radicals, xylyl radicals and ethylphenyl radicals; and aralkyl radicals such as the benzyl radical, and the α- and β-phenylethyl radicals.

Examples of $R^1$ hydrocarbon radicals fully hold for $R^3$ and $R^4$ hydrocarbon radicals.

Examples of $R^2$ divalent hydrocarbon radicals are alkylene radicals of the formulae —$CH_2$—, —$CH_2CH_2$—, —$CH_2CH_2CH_2$—,
—$CH_2CH_2CH_2CH_2$—, —$CH_2CH(CH_3)$—, and examples of $R^2$ divalent hydrocarbon radicals which may contain one or more separate oxygen atoms are those of the formula —$CH_2CH_2OCH_2CH_2$—, —$CH_2CH(CH_3)OCH_2CH$
$(CH_3)$—, $CH_2CH(CH_3)OCH_2CH_2$—, and

—$CH_2CH_2OCH_2CH_2OCH_2CH_2$—.

Examples of alkyl-ketene dimers (a) are those which derive from $C_8$ to $C_{30}$ carboxylic acids. The R hydrocarbon radicals may be linear, branched or cyclic, linear radicals being preferred. They can be saturated and also mono- or polyunsaturated, in which case saturated linear hydrocarbon radicals are preferred. Preferred alkyl-ketene dimers (a) derive from $C_{12}$ to $C_{28}$ carboxylic acids, and those based on $C_{14}$ to $C_{22}$ carboxylic acids are particularly preferred. The preparation of alkyl-ketene dimers (a) from carboxylic acids is described in U.S. Pat. No. 5,028,236. The general rule is that the number of carbon atoms in the R radical is equal to the number of carbon atoms in the carboxylic acids underlying the alkyl-ketene dimers (a) minus 2. In lieu of one alkyl-ketene dimer of defined chain length R there may also be used mixtures of various alkyl-ketene dimers (a), each differing in the length of R, as are obtainable for example from carboxylic acid mixtures originating in natural sources. Suitable fatty alkyldiketenes are described in EP 1 259 672 B1 at page 2 lines 52-57.

The amino compounds (b) used in the first step of the process according to the present invention contain at least one tertiary amino group and additionally also at least one protic group selected from the group consisting of the formulae —OH, —$NH_2$, —NHR and —NH—. This protic group serves to react with the alkyl-ketene dimer (a) in a first step and thereby to bond at least one tertiary amino group to the alkyl-ketene dimer. The compound (c) obtained in the first step of the process according to the present invention thus contains at least one tertiary amino group. In the second step of the process according to the present invention, the tertiary amino groups thus bonded are partly or wholly quaternized with alkylating agents (d).

The first step of the process preferably utilizes amino compounds (b) of the general formula

(IV), wherein $R^{4'}$ is $R^3$ or a radical of the formula —$R^1$—Y—H or —$R^1$—$NR^3{}_2$ and a, $R^1$, $R^2$, $R^3$ and Y are each as defined above.

Examples of tertiary amino compounds (b) that additionally bear at least one further protic nitrogen function are:
3-dimethylaminopropylamine,
3-dimethylaminopropylbutylamine,
bis(3-dimethylaminopropyl)amine,
bis(3-aminopropyl)methylamine,
3-diethylaminopropyl-1-methylamine,
2-diethylaminoethylamine,
3-aminopropyl-3-dimethylaminopropylamine.

Examples of tertiary amino compounds (b) that additionally bear at least one further OH group are:

2-diethylaminoethanol,
2-dimethylaminoethanol,
3-dimethylaminopropanol,
2-dimethylamino-1-methylethanol,
bis(hydroxyethyl)methylamine,
2-cyclohexylaminoethanol,
2-morpholinoethanol,
2-(2-dimethylaminoethoxy)ethanol,
N,N,N-trimethyl—N-hydroxyethylbisaminoethyl ether,
bis(3-dimethylaminopropyl)hydroxyethylamine,
3-dimethylaminopropyl-bis-(2-hydroxyethyl)amine,
3-dimethylaminopropyl-2-hydroxyethylamine,
tris(2-hydroxyethyl)amine.

Further examples of tertiary amino compounds (b) are the recited amino compounds in their ethoxylated or propoxylated form.

Suitable alkylating agents (d) for use in the second step of the process include any compound that has a quaternizing effect on tertiary amino groups.

Alkylating agents (d) preferably have the formula

$$R^5—X \quad (V),$$

wherein $R^5$ is as defined above, and

X is a radical which in the step of alkylating the tertiary nitrogen atoms in the compounds (c) forms a counter-ion $X^-$ to the positive charge on the quaternary nitrogen atom.

$R^5$ is preferably a linear, branched or cyclic alkyl radical of 1 to 6 carbon atoms.

Examples of $R^5$ radicals are the methyl, ethyl, propyl, isopropyl, butyl, isobutyl and cyclohexyl radicals.

Examples of suitable alkylating agents (d) are dialkyl sulfates such as dimethyl sulfate and diethyl sulfate; sulfonic esters such as methyl p-toluenesulfonate, ethyl p-toluenesulfonate, propyl p-toluenesulfonate, and also benzyl compounds such as benzyl chloride, benzyl bromide and benzyl iodide. Dimethyl sulfate, diethyl sulfate and methyl p-toluenesulfonate are particularly preferred.

Examples of counter-ions $X^-$ to the positive charge on the quaternary nitrogen atom are

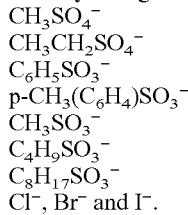

$CH_3SO_4^-$
$CH_3CH_2SO_4^-$
$C_6H_5SO_3^-$
p-$CH_3(C_6H_4)SO_3^-$
$CH_3SO_3^-$
$C_4H_9SO_3^-$
$C_8H_{17}SO_3^-$
$Cl^-$, $Br^-$ and $I^-$.

The two-stage process can be carried out in two separate steps of synthesis as well as preferably in a tandem process in one reaction system. Since the alkyl-ketene dimers (a) are mostly solid at 25° C., the first step of the process is preferably carried out at elevated temperature in the range from 40 to 140° C., preferably at 50 to 120° C.

The second step of the process preferably takes place at 60 to 140° C. If desired, the entire synthesis is advantageously performable in one operation without cooling down in between.

The process for preparing the β-ketocarbonylquats (1) of the present invention is preferably carried out at the pressure of the ambient atmosphere, i.e., at 1020 hPa for instance, but can also be carried out at higher or lower pressures.

The first step of the process preferably utilizes alkyl-ketene dimer (a) in amounts of 0.8 to 1.2 mol of diketene and preferably 0.9 to 1.1 mol of diketene per mole of protic group in amino compound (b).

It is most preferred to use alkyl-ketene dimers (a) in an equimolar amount relative to the protic groups in amino compounds (b). It must be borne in mind here that (a) is rarely pure alkyl-ketene dimer and is usually commercially available at a purity of 85 to 95%.

The second step of the process preferably utilizes alkylating agents (d) in amounts of 0.8 to 1.0 mol, more preferably 0.9 to 1.0 mol, per mole of tertiary nitrogen atom in compound (c). The purity of the alkylating agent must also be taken into account here as well as that of the other components. Should these contain impurities that likewise react with the alkylating agent, complete quaternization of tertiary nitrogen atoms may also require more than the preferred 1.0 mol of alkylating agent per mole of tertiary nitrogen atom.

The process for preparing the β-ketocarbonylquats (1) of the present invention is advantageous over the process for preparing the familiar esterquats described in US 2009/0247629 A1, for example, in that the amidation in the first step of the process takes less than 30 minutes at 60° C. versus US 2009/0247629 A1 where the esterification, which moreover is never complete, takes many hours (3-8 hours) at 200° C. and the subsequent conversion of the ester amine to the esterquat takes a further 6-9 hours at 90° C.

A further advantage is that the present invention provides an almost quantitative quaternization, as compared with a 60-90% degree of quaternization in the prior art preparation of esterquats.

As a result, no excesses of alkylating agent (d) have to be used to achieve an almost quantitative quaternization and therefore there are no toxic alkylating agents (d) in the end product. Even when alkylating agent (d) is intentionally used in slight deficiency, the yields obtained are still very high.

This provides for a very high active content and hence correspondingly minimized wastewater burden due to by-products.

A further advantage is that the β-ketocarbonylquats of the present invention are biodegradable.

Any organopolysiloxane that is liquid at 25° C. and 1020 hPa and capable of conferring a softening effect can be used as organopolysiloxane (2) in the composition of the present invention. It can be purely an organopolysiloxane, constructed exclusively of siloxane units, or else a copolymer with an organic polymer, i.e., a copolymer with a blocked structure made up of siloxane units and organic polymer units.

However, organopolysiloxanes are preferred, preferably those which are substantially linear.

These linear organopolysiloxanes are essentially composed of chain-type building blocks, such as diorganosiloxane units, preferably dimethylsiloxane units, and end-positioned siloxane units. The proportion of diorganosiloxane units, preferably dimethylsiloxane units, is preferably not less than 90 wt %, more preferably not less than 95 wt % and even more preferably not less than 98 wt %, all based on the mean overall weight of organopolysiloxanes (2). In the case of linear organopolysiloxanes terminated with triorganosiloxane units, preferably trimethylsiloxane units, the ratio of diorganosiloxane units to triorganosiloxane units, preferably dimethylsiloxane units to trimethylsiloxane units, is preferably not less than 20:1, more preferably 50:1 and even more preferably 100:1.

Examples of organopolysiloxanes (2) are dialkylpolysiloxanes, such as dimethylpolysiloxanes, with alkyl, alkoxy or hydroxyl end groups; dialkylpolysiloxanes with primary, secondary, tertiary and/or quaternary amino groups; copolymers of siloxane units and organic polymer units, such as polyethers, polyesters, polycarbonates and polyurethanes/polyureas.

The concentration of any amino groups in said organpolysiloxanes (2) is preferably not more than 0.3 mequiv. N/g.

Organopolysiloxane (2) preferably has the general formula

    (VI), where

R' is a hydrocarbon radical having 1 to 18 carbon atoms, preferably a $C_1$-$C_{18}$-alkyl radical, more preferably a $C_1$-$C_4$-alkyl radical, R" is R', a hydroxyl radical or a $C_1$-$C_{18}$-alkoxy radical and m is an integer from 20 to 5000, preferably 100 to 2000, more preferably 300 to 2000.

Examples of R' alkyl radicals are the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical. The methyl radical is particularly preferred.

An alkoxy R" is preferably a $C_1$-$C_4$-alkoxy radical.

The viscosity of organopolysiloxanes (2) used according to the present invention is preferably in the range from 50 to 100,000 mPa·s (25° C.), and preferably in the range from 100 to 20,000 mPa·s (25° C.).

Preferably, the compositions of the present invention are aqueous dispersions, such as aqueous emulsions.

The composition of the present invention preferably comprises (A) a dispersion of a β-ketocarbonylquat comprising
(1) a β-ketocarbonylquat,
(3) optionally an organic solvent,
(4) optionally an emulsifier, and
(5) water
and
(B) a dispersion of an organopolysiloxane or siloxane copolymer comprising
(2) an organopolysiloxane or siloxane copolymer that is liquid at 25° C. and 1020 hPa,
(4') optionally an emulsifier, and
(5') water,
with the proviso that the composition is either a 2-component composition or a mixture of (A) with (B) in the form of a 1-component composition.

Since the quats (1) of the present invention are usually waxy solids at 25° C., they, like the esterquats of the prior art, can be diluted with organic solvents (3) for improved processability in producing said dispersions (A). These dilutions are admixed with water, preferably under slight heating at 30 to 80° C., if necessary in the presence of emulsifiers, when quat (1) of the present invention is not self-dispersing.

The dispersions may comprise preservatives to prolong their stability.

Examples of organic solvents (3) useful for producing the dispersions (A) are alcohols such as methanol, ethanol, n-propanol and isopropanol, and glycol ethers such as diethylene glycol monobutyl ether (butyldiglycol).

Dispersions (A) preferably utilize organic solvents (3) in amounts of 0 to 50 parts by weight, more preferably 10 to 50 parts by weight, all based on 100 parts by weight of β-ketocarbonylquats (1).

Emulsifiers (4) can also be used to produce the dispersions (A). Nonionic, cationic and anionic emulsifiers, preferably nonionic emulsifiers, can be used, both singly and as mixtures of various emulsifiers.

Useful Anionic Emulsifiers Include:

1. Alkyl sulfates, particularly those having a chain length of 8 to 18 carbon atoms, alkyl and alkaryl ether sulfates having 8 to 18 carbon atoms in the hydrophobic moiety and 1 to 40 ethylene oxide (EO) and/or propylene oxide (PO) units.

2. Sulfonates, particularly alkyl sulfonates having 8 to 18 carbon atoms, alkylaryl sulfonates having 8 to 18 carbon atoms, taurides, esters and monoesters of sulfosuccinic acid with monohydric alcohols or alkylphenols having 4 to 15 carbon atoms; these alcohols or alkylphenols may optionally also be ethoxylated with from 1 to 40 EO units.

3. Alkali metal and ammonium salts of carboxylic acids having 8 to 20 carbon atoms in the alkyl, aryl, alkaryl or aralkyl moiety.

4. Phosphoric partial esters and their alkali metal and ammonium salts, particularly alkyl and alkaryl phosphates having 8 to 20 carbon atoms in the organic moiety, alkyl ether or alkaryl ether phosphates having 8 to 20 carbon atoms in the alkyl or, respectively, alkaryl moiety and 1 to 40 EO units.

Suitable nonionic emulsifiers are particularly:

5. Polyvinyl alcohol which still contains 5 to 50%, preferably 8 to 20% of vinyl acetate units, with a degree of polymerization in the range from 500 to 3000.

6. Alkyl polyglycol ethers, preferably those with 8 to 40 EO units and alkyl moieties of 8 to 20 carbon atoms.

7. Alkylaryl polyglycol ethers, preferably those with 8 to 40 EO units and 8 to 20 carbon atoms in the alkyl and aryl moieties.

8. Ethylene oxide-propylene oxide (EO—PO) block copolymers, preferably those having 8 to 40 EO and/or PO units.

9. Addition products of alkylamines with alkyl moieties of 8 to 22 carbon atoms with ethylene oxide or propylene oxide.

10. Fatty acids of 6 to 24 carbon atoms.

11. Alkylpolyglycosides of the general formula R*—O—$Z_o$, where R* is a linear or branched, saturated or unsaturated alkyl moiety having on average 8-24 carbon atoms and $Z_o$ is an oligoglycoside moiety having on average o=1-10 hexose or pentose units or mixtures thereof.

12. Natural products and derivatives thereof, such as lecithin, lanolin, saponins, cellulose; cellulose alkyl ethers and carboxyalkylcelluloses, the alkyl groups of which each have up to 4 carbon atoms.

13. Linear organo(poly)siloxanes containing polar groups, especially those linear organo(poly)siloxanes containing alkoxy groups having up to 24 carbon atoms and/or up to 40 EO and/or PO groups.

Useful cationic emulsifiers include:

14. Salts of primary, secondary and tertiary fatty amines of 8 to 24 carbon atoms with acetic acid, sulfuric acid, hydrochloric acid and phosphoric acids.

15. Quaternary alkyl- and alkylbenzeneammonium salts, especially those where the alkyl group has from 6 to 24 carbon atoms, especially the halides, sulfates, phosphates and acetates.

16. Alkylpyridinium, alkylimidazolinium and alkyloxazolinium salts, especially those where the alkyl chain has up to 18 carbon atoms, specifically the halides, sulfates, phosphates and acetates.

Useful Ampholytic Emulsifiers Include:

17. Amino acids having long-chain substituents, such as N-alkyldi(aminoethyl)glycine or N-alkyl-2-aminopropionic acid salts.

18. Betaines, such as N-(3-acylamidopropyl)-N,N-dimethyl-ammonium salts with a $C_8$-$C_{18}$ acyl moiety and alkylimidazolium betaines.

Preference for use as emulsifiers is given to nonionic emulsifiers, especially the alkyl polyglycol ethers recited above under 6, the addition products of alkylamines with ethylene oxide or propylene oxide, recited under 9, the alkylpolyglycosides recited under 11, and the polyvinyl alcohol recited under 5.

Dispersions (A) are prepared using emulsifiers (4) preferably in amounts of 0 to 25 parts by weight, more preferably 1 to 18 parts by weight, all based on 100 parts by weight of β-ketocarbonylquats (1).

Dispersions (A) are prepared using water (5), preferably in amounts of 50 to 600 parts by weight, more preferably 100 to 500 parts by weight, all based on 100 parts by weight of β-ketocarbonylquats (1).

Dispersion (B) of the present invention is prepared by mixing, preferably intensive mixing of organopolysiloxanes (2) with water (5') optionally with emulsifiers (4').

Technologies for producing emulsions of organopolysiloxanes are known. Intensive mixing can thus take place in rotor-stator stirred devices, colloid mills or high pressure homogenizers.

Useful emulsifiers (4') include the emulsifiers (4) used for producing the dispersions (A). Nonionic emulsifiers are preferred.

Dispersions (B) are prepared using emulsifiers (4'), preferably in amounts of 0 to 25 parts by weight, more preferably 1 to 18 parts by weight, all based on 100 parts by weight of organopolysiloxanes (2).

Dispersions (B) are prepared using water (5'), preferably in amounts of 10 to 150 parts by weight, more preferably 20 to 100 parts by weight, all based on 100 parts by weight of organopolysiloxanes (2).

Dispersions (A) and (B) are used in such quantities by weight that the quantitative ratio of β-ketocarbonylquat (1) to organopolysiloxane (2) is preferably in the range from 1:99 to 99:1 and more preferably in the range from 1:10 to 10:1.

The present invention further provides fabric conditioners comprising the compositions of the present invention.

Dispersions (A) are used in the fabric conditioners in such amounts that the β-ketocarbonylquats (1) are present in amounts of 0.01 to 20 wt %, based on the overall weight of the fabric conditioner.

Dispersions (B) are used in the fabric conditioners in such amounts that the organopolysiloxanes (2) are present in amounts of 0.01 to 20 wt %, based on the overall weight of the fabric conditioner.

Dispersions (A) and (B) can be present separately as 2-component systems or as mixtures of dispersions (A) with dispersions (B) in the form of 1-component systems.

The fabric conditioners of the present invention, in addition to β-ketocarbonylquats (1) and organopolysiloxanes (2), or as the case may be in addition to dispersions (A) and (B), contain customary constituents of fabric conditioners.

Examples of further constituents in the fabric conditioners are primary alcohols, such as ethanol or isopropyl alcohol; surfactants, especially nonionic surfactants, as described above under emulsifiers 1. to 18, salts of alkaline earth metals, such as calcium chloride or magnesium chloride, and also fragrances.

Textiles treated with the compositions of the present invention have an improved softness and an improved hydrophilicity than those based on esterquats as per the prior art.

The β-ketocarbonylquats of the present invention exhibit a surprisingly high hydrophilicity compared with the familiar esterquats, which are hydrophobic. The excellent hydrophilicity is also surprising because alkyl-ketene dimer dispersions have long been used worldwide for controlled hydrophobicization of paper (paper sizing), and comparable uses are known from CH 388246 and U.S. Pat. No. 5,028,236.

In their preferred amide form, the β-ketocarbonylquats of the present invention are also appreciably more stable to hydrolysis than the commercially available esterquats, which can therefore only be handled and used within a narrow pH range.

The process of the present invention can also be used to prepare bactericidal β-ketocarbonylquats having a longer alkyl chain R.

The supremely graduated reactivity of alkyl-ketene dimer also makes it possible to use amino compound (b) with OH groups, such as dimethylaminoethanol, to prepare corresponding alkyl-ketene dimer esterquats when ester groups are desired between the hydrophobic portion and the hydrophilic portion.

The β-ketoamide structure in the β-ketocarbonylquats of the present invention has the advantage that it can be used for complexation of metal ions. This provides further possible means of attachment to surfaces.

Preparing the β-ketocarbonylquats of the present invention:

Example 1

119 g of alkyl-ketene dimer having a diketene equivalent weight of 570 g/mol (alkyl radical R about 16 carbon atoms, commercially available as "AKD" from Trigon Chemie GmbH) are carefully melted without overheating. At 63° C., 21.4 g of 3-dimethylaminopropylamine are gradually metered in with cooling and efficient stirring, and so an internal temperature of 75° C. is not exceeded. A few minutes after completion of the metered addition, the amidation has concluded. An amidoamine is obtained with an amine number of 1.48 (theoretically 1.49), indicating a virtually 100% yield.

The amidoamine obtained is heated to 100° C. and altogether 37.2 g of methyl p-toluenesulfonate (0.95 mol per mole of tertiary amino group in the amidoamine) are added over a period of 30 minutes. The system is allowed to react at 100° C. for a further 2 hours to obtain 177.6 g of a dialkylacetoacetamidoquat, which solidifies on cooling. The product has an amine number of 0.07, which corresponds to a quaternization of about 94%. This value is in good agreement with the intended 5% underfeeding of the methyl p-toluenesulfonate (MeOTs).

Example 2

119 g of the alkyl-ketene dimer described in Example 1 (570 g/mol of diketene) are gradually admixed at 61° C. with altogether 39.2 g of bis(3-dimethylaminopropyl)amine (commercially available under the tradename "JEFFCAT Z 130" from Huntsman). The exothermic amidation reaction concludes shortly after terminating the end of the metered addition. Thereafter, the amidoamine obtained is admixed at 100° C. with 74.5 g of methyl p-toluenesulfonate (0.95 mol per mole of tertiary amino group in the amidoamine), added a little at a time, while the reaction mixture reaches 118° C. The reaction is allowed to go to completion at 100° C. in the course of 2 hours. According to an amine number of 0.11, about 94% of the tertiary amino groups have been quaternized.

Production of Emulsion (A) from the β-ketocarbonylquats of the Present Invention:

5.0 g of the β-ketocarbonylquat obtained in Example 1 (AKD Quat 1) in a glass beaker are carefully melted and are mixed with 0.5 g of isopropanol. Then, 21.3 g of water are added at 50° C., and also 1.0 g of an 80% solution of isotridecyl alcohol decaethoxylate as emulsifier. This mixture is intensively mixed using a magnetic stirrer to obtain a homogeneous, yellowish emulsion having an active content of 18%.

Producing a Comparative Emulsion (V1) From a Commercially Available Esterquat:

200 g of a commercially available esterquat solution (90% active/10% isopropanol) available under the designation VK90 (from Stepan) are stirred into 800 ml of water using a blade stirrer and adjusted to pH 3 to obtain a yellowish dispersion having an active content of 18%.

Preparation of Silicone Oil Emulsion (B):

In a PC Laborsysteme Dissolver type LDV 1 from PC Laborsystem GmbH, Magden/Switzerland, 26.40 g of PEG-10 isotridecyl ether and 14.00 g of distilled water are initially charged and homogenized at 500 rpm for two minutes. Then, 480.00 g of a silicone oil (trimethylsilyl-terminated dimethylpolysiloxane) having a viscosity of 350 mPa·s (25° C.) are added and homogenized at 2000 rpm for 10 minutes. Thereafter, 278 ml of distilled water are added in two steps and homogenized at 2000 rpm for altogether 15 minutes. Then, 1.0 g of a 10% solution of chloromethylisothiazolinone and methylisothiazolinone is added as a preservative.

Producing the Mixture of (A) and (B):

27 g of emulsion (A) from the β-ketocarbonylquat of the present invention were weighed into a glass beaker, followed by the addition of 2.33 g of silicone oil emulsion (B). A spatula was used to stir the beaker contents until everything was homogeneously dispersed. The mixture was subsequently used in a washing machine.

Using the Mixture as Fabric Conditioner:

Experimental Descriptions:

The following fabric is used for finishing in a washing machine: terry toweling (100% cotton, about 45×90 cm, about 200 g, about 500 g/m$^2$)

Before use, the fabrics to be tested are washed twice at 95° C. with fully-built laundry detergent (e.g., Persil washing powder) in a domestic washing machine of the Miele Novotronic W 941 type and then line dried.

Softening in the Rinse Cycle:

For finishing, a terry towel is introduced into the washing machine together with 2.0 kg of ballast laundry (cotton fabric). 80 g of fully built laundry detergent (e.g., Persil washing powder) are placed directly in the drum and the washing machine is started in the full wash cycle at 40° C. and a German water hardness of 3°. The fabric conditioner is added by hand directly into the drum at the start of the last rinse cycle. The automatic fabric conditioner dosing via the dispenser is not used. Spin speed is 1600 rpm. The fabrics are subsequently line dried. This is followed by conditioning overnight in a conditioning chamber at 23° C. and a relative humidity of 60%.

Softness Assessment by Hand:

The terry towels to be assessed are assigned numbers from 1 to n. In a blank test, a tester is given the first towel as a standard (No. 1). The tester then compares, one after the other, the softness of the standard towel with that of towel No. 2. If the standard towel is rated softer, it is graded 1; if it is harsher, it is graded 0, and if the two are found to be of equal softness, it is graded 0.5. This result is entered in a table. Towel No. 1 is then compared with No. 3, then with No. 4, etc., until n. Then, towel No. 2 becomes the standard and is compared with Nos. 1, 3, 4 to n, etc. The individual grades are summed to produce the softness grade. The higher the grade, the softer the towel. The test is conducted with at least 5 testers.

Droplet Absorption Time Test Method:

The fabric to be assessed is laid across a Petri dish having a diameter of 140 mm, so the place to be tested was not in contact with the support. 70 μl of completely ion-free water are pipetted onto the fabric and the stopwatch is started. It is stopped when the droplet of water has become completely absorbed and the first fabric structures are visible underneath. Triple determinations are carried out in every case at various locations of the fabric. The reported droplet absorption time is the mean of the three replications. The maximum time allowed is 60 s; if the droplet has not become fully absorbed by then, the droplet absorption time is reported as >60 s.

In the rinse cycle, a liquor concentration of 360 weight ppm of the organic quat (inventive β-ketocarbonylquat or comparative esterquat) is set, and/or additionally 100 weight ppm of the silicone oil (weight ppm all based on active content).

The droplet absorption time on the terry towel (cotton fabric) is measured. Softness is determined using the method of assessment described.

The results are summarized in the table.

TABLE

| Fabric conditioner active | Droplet absorption time (seconds) | Softness hand assessment |
| --- | --- | --- |
| comparative: V1 | 26 | 1.0 |
| comparative: V1 + silicone oil B | 17 | 3.0 |
| invention: A + silicone oil B | 1 | 6.0 |

Combining the commercially available esterquat emulsion V1 with the silicone oil emulsion B is sufficient to produce improved hydrophilicity compared with the use of the purely esterquat emulsion V1. The decisive as well as surprising improvement, however, is only achieved on replacing the commercially available esterquat emulsion V1 by the inventive β-ketocarbonylquat emulsion A.

With regard to softness, adding the silicone oil emulsion to the commercially available esterquat emulsion V1 does bring an improvement, but the decisive improvement is only achieved on replacing the commercially available esterquat emulsion V1 by the inventive β-ketocarbonylquat emulsion A.

The invention claimed is:

1. A composition comprising:
   (1) a β-ketocarbonylquat containing one or more β-ketocarbonyl groups of the formula

R—CH$_2$—(C=O)—CHR—(C=O)—     (I)

and
   one or more quaternary ammonium groups, where
   R is an aliphatic hydrocarbon radical of 6 to 28 carbon atoms and may be the same or different in each occurrence, and
   (2) an organopolysiloxane or siloxane copolymer that is liquid at 25° C. and 1020 hPa.

2. The composition of claim 1, which is in the form of an aqueous dispersion.

3. The composition of claim 1, in the form of:
(A) a dispersion of a β-ketocarbonylquat comprising
   (1) a β-ketocarbonylquat (1),
   (3) optionally an organic solvent,
   (4) optionally an emulsifier, and
   (5) water
and
(B) a dispersion of an organopolysiloxane or siloxane copolymer comprising
   (2) an organopolysiloxane or siloxane copolymer that is liquid at 25° C. and 1020 hPa,
   (4') optionally an emulsifier, and
   (5') water,
with the proviso that the composition is either a 2-component composition or a mixture of (A) with (B) in the form of a 1-component composition.

4. The composition of claim 1, wherein said β-ketocarbonylquat (1) has the formula $$[R^3R^4R^5N^{(+)}{-}R^2{-}]_aY{-}ZX^{(-)} \qquad (II),$$

wherein
a is 1 or 2, with the proviso that when
   a=1, Y is a divalent radical and
   when a=2, Y is a trivalent radical,
Y is a divalent radical of the formula $-O-$, $-NH-$, $-NR^1-$, or a trivalent radical of the formula $=N-$,
$X^{(-)}$ is a counter-ion to the positive charge on the quaternary nitrogen atom,
Z is a β-ketocarbonyl group of the formula $$R{-}CH_2{-}(C{=}O){-}CHR{-}(C{=}O){-} \qquad (I),$$

R is an aliphatic hydrocarbon radical of 6 to 28 carbon atoms,
$R^1$ is a monovalent hydrocarbon radical of 1 to 30 carbon atoms,
$R^2$ is a divalent $C_1$-$C_{18}$ hydrocarbon radical which may contain one or more separate oxygen atoms,
$R^3$ is a monovalent hydrocarbon radical of 1 to 30 carbon atoms,
$R^4$ is $R^3$ or a radical of the formula
   $-R^1-Y-Z$ or $-R^1-N^{(+)}R^3{}_2R^5X^{(-)}$,
or $R^3$ and $R^4$ together or two $R^3$ radicals together are a divalent $C_3$-$C_{12}$ hydrocarbon radical which may optionally contain an oxygen atom or a nitrogen atom, and
$R^5$ is a monovalent hydrocarbon radical of 1 to 18 carbon atoms, preferably 1 to 12 carbon atoms,
wherein R, $R^1$, $R^2$, $R^3$ and $R^4$ are the same or different in each occurrence.

5. The composition of claim 4, wherein
R has 10 to 26 carbon atoms,
$R^1$ has 1 to 18 carbon atoms, and
$R^3$ has 1 to 18 carbon atoms.

6. The composition of claim 4, wherein
R has 12 to 20 carbon atoms.

7. The composition of claim 5, wherein
R has 12 to 20 carbon atoms.

8. The composition of claim 4, wherein Y in formula (II) is $-NH-$, $-NR^1-$ or $=N-$,
where $R^1$ is a monovalent hydrocarbon radical of 1 to 30 carbon atoms.

9. The composition of claim 8, wherein $R^1$ has 1 to 18 carbon atoms.

10. The composition of claim 1, wherein said organopolysiloxane (2) has the formula $$R''R'_2SiO(R'_2SiO)_mSiR'_2R'' \qquad (VI),$$

where
R' is a hydrocarbon radical having 1 to 18 carbon atoms,
R'' is R', a hydroxyl radical or a $C_1$-$C_{18}$-alkoxy radical and
m is an integer from 20 to 5000.

11. The composition of claim 10, wherein R' is a $C_{1-18}$ alkyl radical.

12. The composition of claim 10, wherein R' is a $C_{1-4}$ alkyl radical.

13. The composition of claim 10, wherein m is from 100 to 2000.

14. A fabric conditioner, comprising a composition of claim 1.

15. A fabric conditioner, comprising a composition of claim 1.

16. A fabric conditioner, comprising a composition of claim 4.

17. A fabric conditioner, comprising a composition of claim 8.

18. A fabric conditioner, comprising a composition of claim 10.

* * * * *

UNITED STATES PATENT AND TRADEMARK OFFICE
CERTIFICATE OF CORRECTION

| | | |
|---|---|---|
| PATENT NO. | : 8,722,612 B2 | Page 1 of 1 |
| APPLICATION NO. | : 13/996155 | |
| DATED | : May 13, 2014 | |
| INVENTOR(S) | : Christian Herzig et al. | |

It is certified that error appears in the above-identified patent and that said Letters Patent is hereby corrected as shown below:

In the Claims

Column 14, Line 36, Claim 15:

After "comprising a composition of claim"
Delete "1" and insert -- 3 --.

Signed and Sealed this
Thirtieth Day of September, 2014

Michelle K. Lee
*Deputy Director of the United States Patent and Trademark Office*